United States Patent

Narita et al.

[11] Patent Number: 6,122,934
[45] Date of Patent: Sep. 26, 2000

[54] HOT ISOSTATIC PRESSING OF A PLANAR OPTICAL WAVEGUIDE

[75] Inventors: Takeshi Narita, Kanagawa-ken; Shigeru Kawaguchi, Yokohama; Shigemi Sato, Miura, all of Japan

[73] Assignee: NHK Spring Co., Ltd., Yokohama, Japan

[21] Appl. No.: 09/175,137

[22] Filed: Oct. 19, 1998

[30] Foreign Application Priority Data

Oct. 22, 1997 [JP] Japan .................................... 9-289813

[51] Int. Cl.⁷ .............................. C03B 11/00; C03B 29/02
[52] U.S. Cl. .............................................. 65/379; 65/386
[58] Field of Search .............................. 65/386, 428, 379

[56] References Cited

U.S. PATENT DOCUMENTS

| | | | |
|---|---|---|---|
| 4,231,775 | 11/1980 | Siegmund | 65/386 |
| 4,494,968 | 1/1985 | Bhagavatula | 65/386 |
| 5,152,818 | 10/1992 | Berkey | 65/412 |
| 5,735,927 | 4/1998 | Sanghera | 65/389 |
| 5,837,024 | 11/1998 | Fabian | 65/427 |
| 5,858,051 | 1/1999 | Komiyama | 65/386 |
| 5,917,109 | 6/1999 | Berkey | 65/428 |

FOREIGN PATENT DOCUMENTS

| | | | |
|---|---|---|---|
| 58-28707 | 2/1983 | Japan | 65/386 |
| 58-118607 | 7/1983 | Japan | 65/386 |

*Primary Examiner*—John Hoffmann
*Attorney, Agent, or Firm*—Frishauf, Holtz, Goodman, Langer & Chick, P.C.

[57] ABSTRACT

An optical waveguide device is provided with a core formed on a substrate and a clad layer. A low-temperature film-forming method, such as the CVD or PVD method, is used in a core forming process for forming the core and a clad forming process for forming the clad layer. The surface of the clad layer is coated with a protective film of chrome or the like in a protective film forming process that is carried out after the clad forming process. In a heating/pressurizing process that is carried out after the protective film forming process, the clad layer is heated and pressurized from its outside by the HIP (hot isostatic pressing) method. This heating/pressurizing process substantially eliminates voids in the clad layer and the like, and enhances or improves the density of a buffer layer, core, and upper clad layer and the transparency of the core layer. The protective film is removed by etching or the like in a removing process.

9 Claims, 4 Drawing Sheets

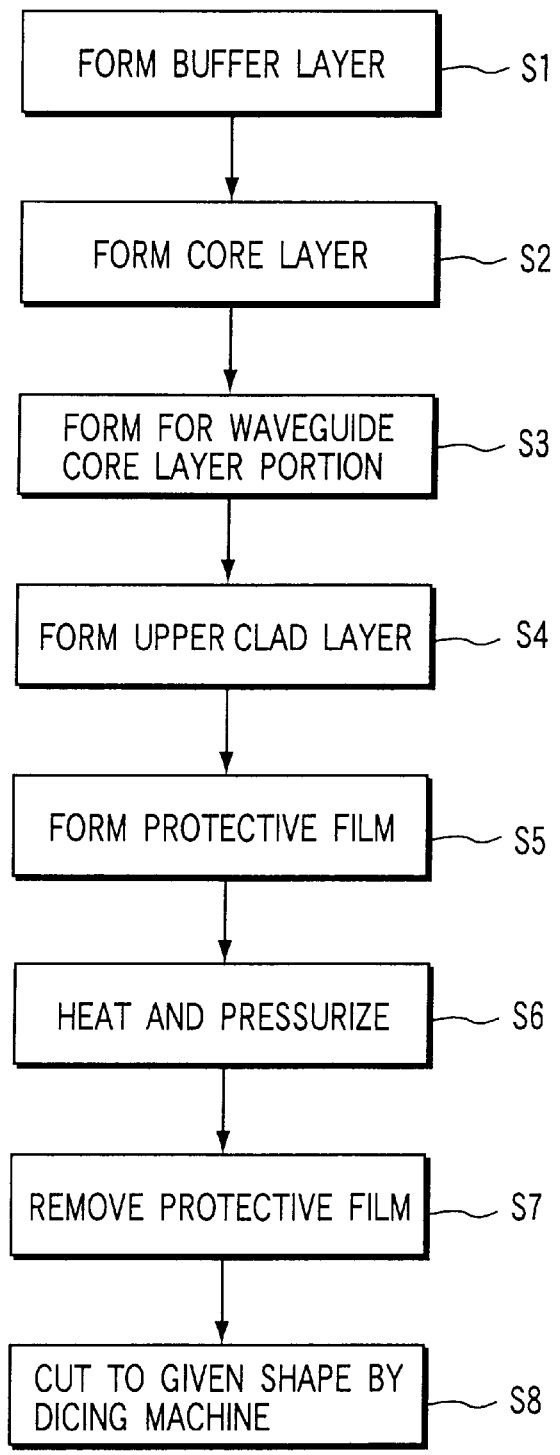
F I G. 3

HOT ISOSTATIC PRESSING OF A PLANAR OPTICAL WAVEGUIDE

BACKGROUND OF THE INVENTION

The present invention relates to a manufacturing method for an optical waveguide device used for the transmission of signal light in the field of, for example, optical communication.

FIGS. 5 and 6 show an optical waveguide device 21 such as an optical star coupler, which is used as an optical integrated circuit (optical IC) for optical communication, for example. As shown in FIG. 6, the device 21 has an embedded waveguide structure, and its refractive index distribution is of the step-index type. The device 21 comprises a substrate 22, formed of a quartz or silicon wafer, buffer layer 23 formed on the substrate 22, core 24, and upper clad layer 25. The buffer layer 23 and the upper clad layer 25 constitute a clad layer as it is called herein. The optical star coupler, as an example of the optical waveguide device 21 shown in FIG. 5, is used as a power branching for signal light. In this device 21, the signal light is inputted through one end 26 of the core 24 or an input end, which is situated on the left-hand side of FIG. 5, and is outputted through a plurality of other ends 27 of the core 24 or output ends, which are situated on the right-hand side of FIG. 5, for example.

Conventionally, the optical waveguide device 21 is manufactured in manufacturing processes shown in FIG. 7, for example. In a buffer forming process S11 and a core forming process S12, a buffer layer 23, consisting mainly of $SiO_2$, and a core 24 are formed on the surface of a substrate 22 by a film-forming method, such as an FHD (flame hydrolysis deposition), CVD (chemical vapor deposition), or PVD (physical vapor deposition) method. In a patterning process S13, a specific waveguide pattern is formed on the surface of the core 24 with use of a photoresist, and is then etched by RIE (reactive ion etching) or some other method, whereupon the core 24 is shaped into a desired pattern. In a clad forming process S14, thereafter, the lower refractive index upper clad layer 25 is formed containing $SiO_2$ as its main ingredient by the aforementioned film-forming method, such as the CVD or PVD method.

In a cutting process S15, the substrate and the like are cut into a given shape by means of a dicing machine, whereupon each individual optical waveguide device 21, such as the optical star coupler shown in FIG. 5, is obtained. An input-side end face 26a and an output-side end face 27a are individually polished to be finished into optically flat surfaces.

The refractive index of the core 24 must be made about 0.2% to 0.32% higher than those of the buffer layer 23 and the upper clad layer 25. To attain this, a doping agent for refractive index enhancement is introduced into the core 24 in the core forming process S12, or a doping agent for refractive index reduction is introduced into the buffer layer 23 and the upper clad layer 25 in the buffer forming process S11 or the clad forming process S14.

According to the FHD method, the speed of deposition of the film to be formed is high enough to form suitably the buffer layer 23, core 24, and upper clad layer 25 that are relatively thick. In forming these layers 23, 24 and 25 by the FHD method, material powder, consisting mainly of $SiO_2$ and the like, is deposited on the substrate 22 and is then heated to a high temperature of 1,200° C. to 1,500° C. Thereupon, the material powder melts and forms a transparent glasslike structure. In this FHD method, however, the high temperature of 1,200° C. or above is used, so that the doping agent may possibly diffuse, or $SiO_2$, the main ingredient of the layers 23, 24 and 25, may flow. Thus, the layers 23, 24 and 25 cannot be easily formed into a desired shape.

In the cases of the CVD and PVD methods, on the other hand, the buffer layer 23, core 24, and upper clad layer 25 can be formed at a temperature (e.g., 500° C. or thereabout) lower enough than in the FHD method. It is relatively easy, therefore, to regulate the thickness and shape of the layers 23, 24 and 25 with high accuracy.

However, the low-temperature film-forming method such as the CVD or PVD method involves the following problems. In the case where the clad layer 25 is formed on a plurality of cores 24a and 24b that have a rectangular cross section and are formed on the buffer layer 23, as shown in FIG. 6, the clad layer 25 sometimes may fail to fill the space between the cores 24a and 24b so that a void 28 is generated. If the space between the cores 24a and 24b is narrow (e.g., 5 μm or less), in particular, the void 28 is generated frequently. If the void 28 is generated, a gap is formed between the clad layer 25 and parts of the respective peripheral surfaces of the cores 24a and 24b. The void 28 entails an increase in loss of the signal light when the light is transmitted through the optical waveguide device 21.

In the case where the layers 23, 24 and 25 are formed at a low temperature by the CVD or PVD method, they tend to be lowered in density and transparency. Thus, the optical waveguide device 21 formed by the low-temperature film-forming method, such as the CVD or PVD method, is subject to substantial scattering of the signal light.

BRIEF SUMMARY OF THE INVENTION

Accordingly, the object of the present invention is to provide a manufacturing method for an optical waveguide device, in which layers that constitute the waveguide device can be accurately formed into a desired shape without involving any substantial voids, and in which the loss and scattering of signal light are not substantial.

In order to achieve the above object, a manufacturing method according to the present invention is a manufacturing method for an optical waveguide device having a core formed on a substrate and a clad layer covering the core, comprising: a core forming process for forming the core on the substrate by a low-temperature film-forming method; a clad forming process for forming the clad layer on the core by the low-temperature film-forming method; and a heating/pressurizing process for heating and pressurizing the clad layer from the periphery thereof at a temperature higher than in the low-temperature film-forming method.

The low-temperature film-forming method according to the invention is a method, such as the CVD or PVD method, in which a film is formed at a temperature lower than the processing temperature (1,200° C. to 1,500° C.) for the FHD method, that is, at a processing temperature of less than 1,200° C.

According to the present invention, the clad layer and the core are formed by the low-temperature film-forming method, such as the CVD or PVD method, and the clad layer is then heated and pressurized from its periphery at the temperature higher than in the low-temperature film-forming method. By doing this, a void generated in the clad layer by the low-temperature film-forming method can be practically eliminated, and the core and the clad layer can be enhanced or improved in density and transparency. Thus, the optical waveguide device obtained is subject to a lower loss and minor scattering of signal light. Since the clad layer and the core are formed by the low-temperature film-forming method, such as the CVD or PVD method, moreover, $SiO_2$, the main ingredient of the layers, can be prevented from flowing, and the layers can be formed securely having a desired thickness and shape.

In the manufacturing method according to the invention, the clad forming process includes introducing phosphorus, titanium, germanium, aluminum, boron, and/or fluorine, as a doping agent for refractive index adjustment, into the clad layer. The glass transition temperature of the clad layer can be lowered by the addition of the doping agent. Accordingly, the heating temperature for the heating/pressurizing process can be lowered, so that the process can be carried out with ease.

The manufacturing method of the invention further comprises a process for forming a protective film of a metal or ceramics on the surface of the clad layer before carrying out the heating/pressurizing process after the clad forming process. During the heating/pressurizing process, the protective film on the surface of the clad layer serves as a gas barrier. Even in the case where a fluid such as an inert gas is used in the heating/pressurizing process, therefore, it can be prevented from penetrating into the clad layer or the core. Thus, the optical waveguide device obtained can transmit the signal light without entailing a substantial loss or scattering, and its layers are highly transparent.

In the manufacturing method of the invention, the low-temperature film-forming method is the CVD and/or PVD method. Further, the heating/pressurizing process is based on the HIP (hot isostatic pressing) method. According to the HIP method, the clad layer and the core can be uniformly pressurized from the periphery by means of a high-temperature fluid such as an inert gas. Thus, the optical waveguide device obtained enjoys a higher quality. Besides, it can transmit the signal light without entailing a substantial loss or scattering, and its layers are highly transparent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a flowchart showing manufacturing processes for the optical waveguide device shown in FIG. 1;

DETAILED DESCRIPTION OF THE INVENTION

Figure 1:
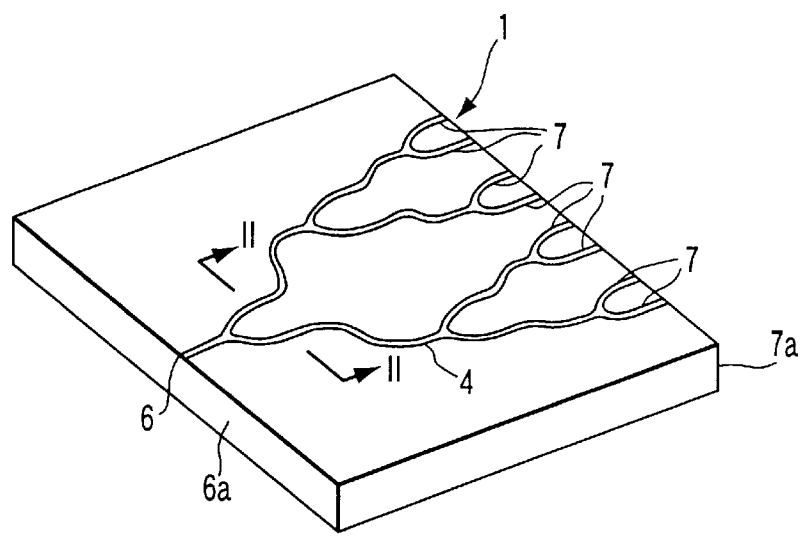
FIG. 1 is a perspective view of an optical waveguide device according to an embodiment of the present invention.
Figure 2:
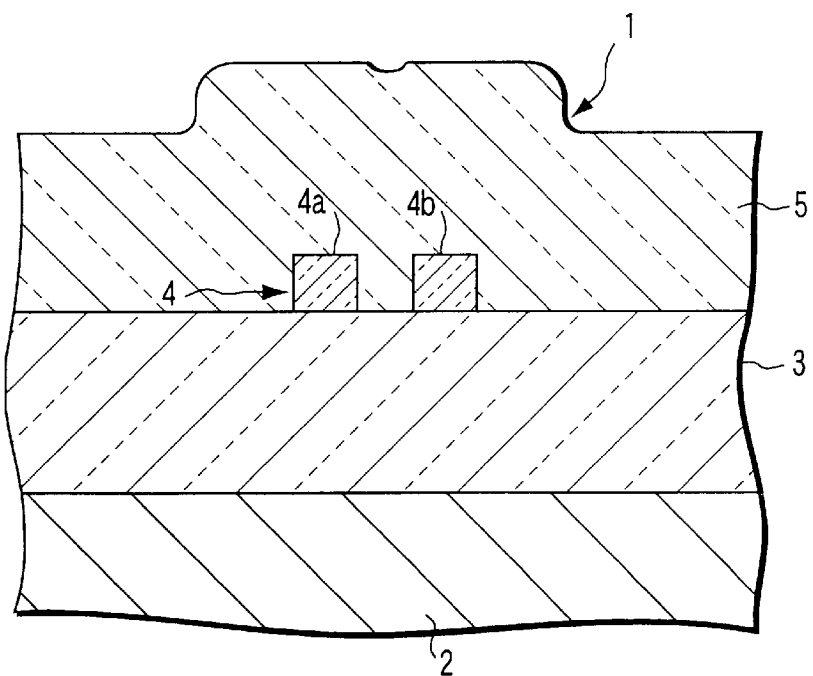
FIG. 2 is a sectional view taken along line II—II of FIG. 1.

Referring now to FIGS. 1 to 4, an embodiment of the present invention will be described. In optical communication, for example, an optical waveguide device 1, such as an optical star coupler, is used to form an optical integrated circuit (optical IC), as shown in FIG. 1. As shown in FIG. 2, the optical waveguide device 1 has an embedded waveguide structure, and its refractive index distribution is of the step-index type. The device 1 comprises a substrate 2, formed of a quartz or silicon wafer, buffer layer 3 formed on the substrate 2, core 4, and upper clad layer 5. The buffer layer 3 and the upper clad layer 5 constitute a clad layer according to the present invention.

The buffer layer 3 is a thin film of, for example, 25-$\mu$m thickness formed on the substrate 2 that has a flat surface. The cross section of the core 4 is in the form of a rectangle, e.g., an 8-$\mu$m square. The refractive index of the core 4 is a little higher than those of the buffer layer 3 and the upper clad layer 5 so that signal light for optical communication can propagate through the core 4. The core 4 is covered by the layers 5 and 3. The clad layer 5 is a thin film of, for example, 25-$\mu$m thickness formed on the buffer layer 3 and the core 4.

The optical star coupler, as an example of the optical waveguide device 1 shown in FIG. 1, is used as a power branching for optical communication. In this optical waveguide device 1, the signal light is inputted through one end 6 of the core 4 or an input end, which is situated on the left-hand side of FIG. 1, and is outputted through a plurality of other ends 7 of the core 4 or output ends, which are situated on the right-hand side of FIG. 1, for example.

The optical waveguide device 1 is manufactured in manufacturing processes shown in FIG. 3, for example. First, in a buffer forming process S1, the lower refractive index buffer layer 3, consisting mainly of $SiO_2$, is formed on the surface of the quartz or silicon substrate 2 (shown in FIG. 2) by a low-temperature film-forming method. A CVD (chemical vapor deposition) method, such as the plasma or heat CVD method, or a PVD (physical vapor deposition) method, such as vacuum evaporation or sputtering, may be employed as the low-temperature film-forming method. In this film-forming method, a film is formed at a relatively low temperature of about 500° C., for example.

Then, in a core forming process S2, the core 4 is formed on the buffer layer 3. The refractive index of the core 4 is adjusted to be about 0.2% to 0.32% higher than that of the buffer layer 3 by adding a doping agent for refractive index adjustment to silicon dioxide ($SiO_2$), the main ingredient of the core 4. In the aforesaid buffer forming process S1, the refractive index of the buffer layer 3 may be made lower than that of the core 4 by introducing a doping agent for refractive index reduction into the buffer layer 3.

In general, the refractive index of the core 4 is expected to be equal to that of the core of an optical fiber that is used for optical communication. Thus, the respective refractive indexes of the buffer layer 3 and the clad layer 5 should be made lower than that of the core 4 by introducing the doping agent for refractive index reduction into the layers 3 and 5, in the buffer forming process S1 and a clad forming process S4 mentioned later, or by introducing a doping agent for refractive index enhancement into the core 4 in the core forming process S2. Preferably, phosphorus, titanium, germanium, and/or aluminum may be used as the doping agent for refractive index enhancement, and boron and/or fluorine may be used as the doping agent for refractive index reduction.

In a patterning process S3, a specific waveguide pattern is formed on the surface of the core 4 with use of a photoresist, and is then etched by RIE (reactive ion etching) or some other method, whereupon the core 4 is shaped after the specific waveguide pattern.

Figure 4:
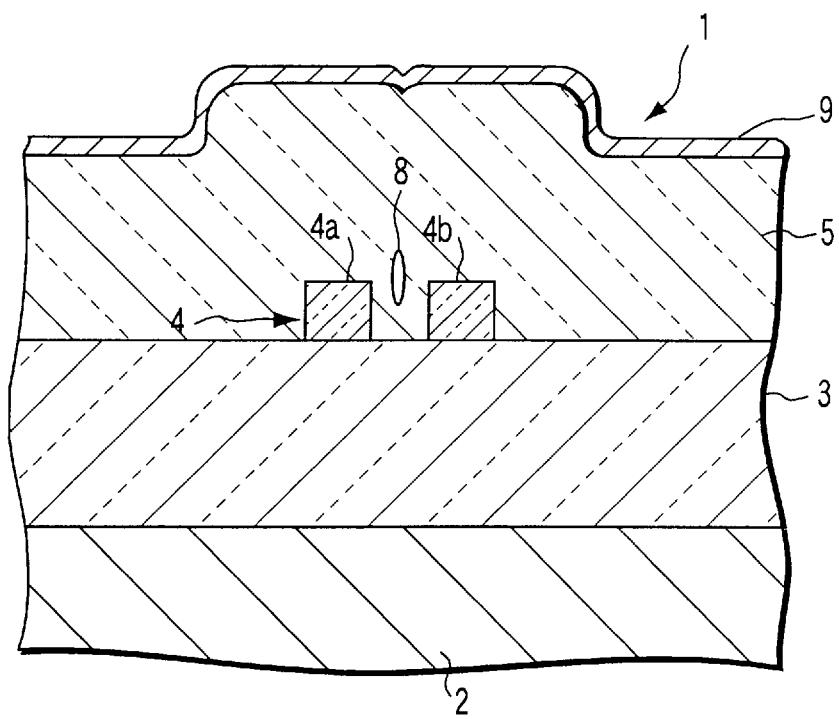
FIG. 4 is a sectional view showing a protective film formed on the surface of a clad layer in one of the device manufacturing processes shown in FIG. 1.
Figure 5:
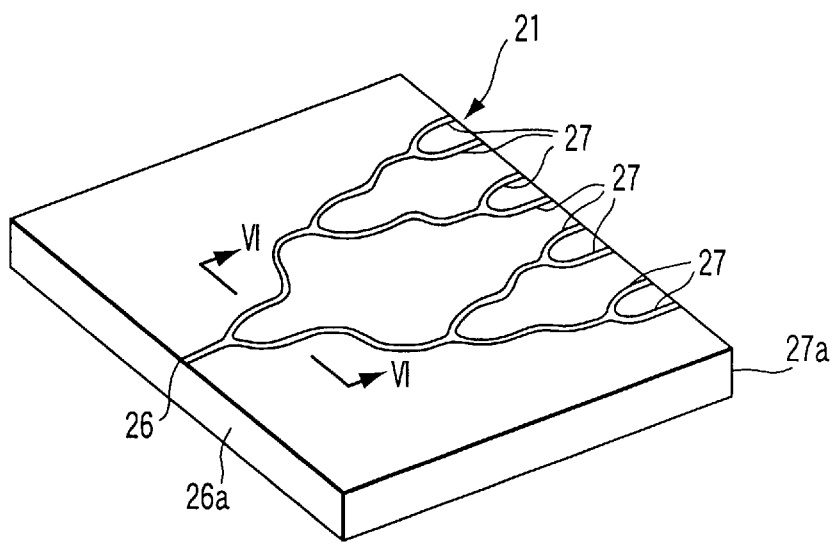
FIG. 5 is a perspective view of a conventional optical waveguide device.
Figure 6:
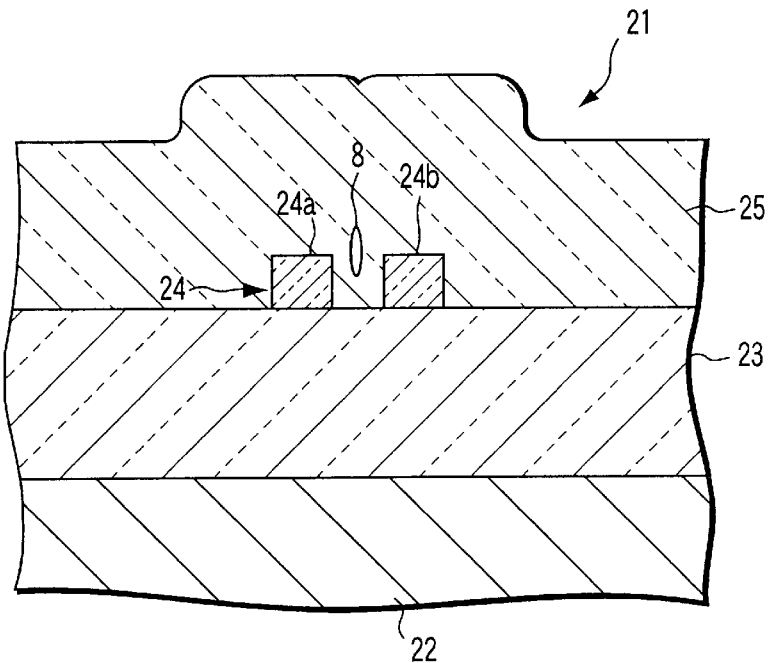
FIG. 6 is a sectional view taken along line VI—VI of FIG. 5.
Figure 7:
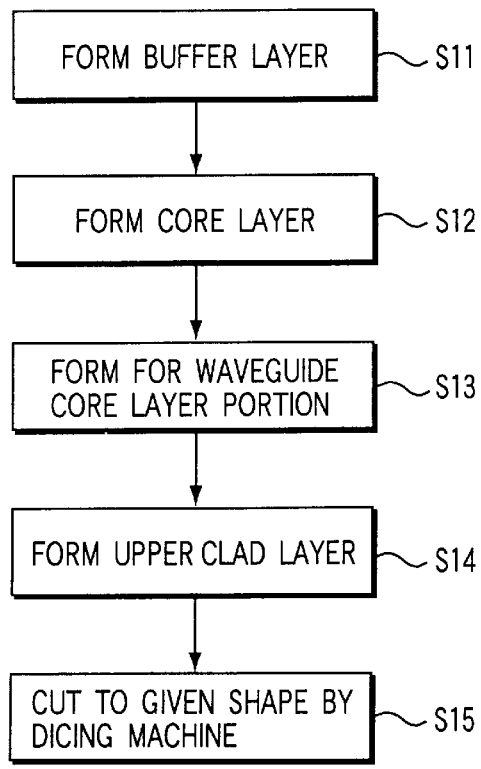
FIG. 7 is a flowchart showing manufacturing processes for the conventional optical waveguide device shown in FIG. 5.

In the clad forming process S4, thereafter, the lower refractive index upper clad layer 5 is formed containing $SiO_2$ as its main ingredient by the aforementioned low-temperature film-forming method, such as the CVD or PVD method. In the case where a plurality of cores 4a and 4b are formed in the patterning process S3, as shown in FIG. 4, $SiO_2$ in the clad layer 5 sometimes may fail to fill the space between the cores 4a and 4b so that a void 8 is generated when the layer 5 is formed in the clad forming process S4. To avoid this, a protective film forming process S5 and a heating/pressurizing process S6 are carried out in the following manner.

In the protective film forming process S5, as shown in FIG. 4, a protective film 9, which serves as a gas barrier, is formed on the surface of the clad layer 5. The protective film 9 is formed of a metal such as chrome or nickel, having a melting point of 1,400° C., or ceramics such as silicon nitride ($Si_3N_4$). The film 9 is a thin film of, e.g., 1-$\mu$m thickness formed by the PVD method such as vacuum evaporation or sputtering using the aforesaid ceramics or metal. In the case where the protective film 9 is formed of a metal that easily oxidizes, it should be prevented from oxidizing and its gas barrier effect should be improved by being coated with a thin film of $SiO_2$.

In the heating/pressurizing process S6, the optical waveguide device 1 having the protective film 9 thereon is heated and pressurized from the outer peripheral surface of the clad layer 5 by the HIP (hot isostatic pressing) method or the like. By doing this, the void 8 can be eliminated or reduced to a practically negligible size, and the layers 3, 4 and 5 can be increased in density and transparency. According to the HIP method, the clad layer 5 is pressurized under the pressure of 1,500 kgf/cm² and heated to 1,100° C. from the outer peripheral surface of the protective layer 9 with a compressed inert gas, e.g., argon, as an example of a pressurized fluid. Preferably, the high pressure and the high temperature should be maintained for about 2 hours, for example. By using this HIP method, the layers 3, 4 and 5 can be pressurized substantially throughout the circumference under an almost uniform pressure.

In the case where the doping agent for the clad layer 5 is formed of phosphorus, titanium, germanium, aluminum, boron, and/or fluorine, the glass transition temperature of the layer 5 is lowered. Accordingly, the heating temperature for the HIP method used in the heating/pressurizing process S6 can be lowered, so that the process S6 can be carried out with ease. Nitrogen gas may be used in place of argon as the inert gas for the HIP method.

Then, in a removing process S7, the protective film 9 is removed by etching or the like. In a cutting process S8, thereafter, the substrate 2 and the layers 3, 4 and 5 are cut in their thickness direction by means of a dicing machine, whereupon the optical waveguide device 1 is obtained having the given size and shape shown in FIG. 1. End faces 6a and 7a (shown in FIG. 1) of the device 1 are individually polished to be finished into optically flat surfaces.

The inventors hereof observed the way the void 8 disappeared in a plurality of samples as the heating temperature and pressure were parametrically changed as shown in TABLE 1, in the case where the HIP method was used in the heating/pressurizing process S6. In TABLE 1, the heating temperature is set at three points, 800° C., 1,000° C., and 1,100° C., and the pressure at 300 kgf/cm², 1,000 kgf/cm², 1,500 kgf/cm², and 1,700 kgf/cm².

TABLE 1

| TEMPERA-<br>TURE | PRESSURE | | | |
|---|---|---|---|---|
| | 300<br>kgf/cm² | 1000<br>kgf/cm² | 1500<br>kgf/cm² | 1700<br>kgf/cm² |
| 800° C. | Voided | Voided | Voided | Voided |
| 1000° C. | Voided | Voided | Voided | No void |
| 1100° C. | Voided | Voided | No void | No void |

The results shown in TABLE 1 indicate that the void 8 cannot be easily eliminated when the pressure is at 300 kgf/cm² or 1,000 kgf/cm² or when the temperature is at 800° C. The results also indicate that the void 8 can be eliminated if the temperature is at 1,100° C. or above when the pressure is at 1,500 kgf/cm², or if the temperature is at 1,000° C. or above when the pressure is at 1,700 kgf/cm². In the heating/pressurizing process S6 according to the embodiment described above, the pressure and temperature for the HIP method are at 1,500 kgf/cm² and 1,100° C., respectively. Alternatively, however, the pressure and temperature may be adjusted to 1,700 kgf/cm² and 1,000° C. or more, respectively.

In the processes S1, S2 and S3 according to the embodiment described above, the layers 3, 4 and 5 are formed by the CVD or PVD method using a low processing temperature (e.g., 500° C. or thereabout). In the heating/pressurizing process S6, thereafter, the layers 3, 4 and 5 are pressurized by means of high-temperature gas. Even though each of the layers 3, 4 and 5 formed by the CVD or PVD method in the processes S1, S2 and S4 has the void 8, therefore, the void 8 practically disappears when the heating/pressurizing process S6 is carried out. In the process S6, moreover, the layers 3, 4 and 5 can be enhanced or improved in density and transparency. Thus, the optical waveguide device 1 obtained is reduced in transmission loss and scattering of the signal light. Since the layers 3, 4 and 5 are formed by the CVD or PVD method using a relatively low temperature, their thickness and shape can be regulated with higher accuracy than in the case of the FHD method using a high processing temperature (e.g., 1,200° C. or above).

According to the embodiment described above, the protective film 9 of a metal or ceramics is formed on the surface of the clad layer 5 in the protective film forming process S5. Even though the core 4 and the clad layer 5 are processed at high temperature and high pressure by the HIP method or the like in the heating/pressurizing process S6, therefore, there is no possibility of argon or nitrogen gas penetrating into the layers 4 and 5. Thus, the optical waveguide device 1 obtained contains less impurities, and is subject to a lower loss and minor scattering of the signal light. As the HIP method is used in the heating/pressurizing process S6, moreover, the clad layer 5 and the core 4 are uniformly pressurized from their outer peripheral surface by means of the pressure of a high-temperature fluid. Accordingly, the core 4 obtained can enjoy a desired accurate shape free from deformation. Thus, the loss of the signal light can be further reduced.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manufacturing method for making a planar optical waveguide device having a plurality of cores formed on a substrate having a flat surface; and a clad layer covering the cores, comprising:

a core forming process comprising forming a core layer on the substrate by a low-temperature film-forming method;

a patterning process comprising etching said core layer to form a plurality of cores adjacent to each other with a clearance interposed therebetween on said substrate;

a clad forming process comprising forming the clad layer covering each core, by the low temperature film-forming method; and a heating/pressurizing process comprising heating and pressurizing the clad layer to collapse a void within the optical waveguide device wherein the heating is at a temperature exceeding 800° C., and which is higher than a temperature used in the low temperature film-forming method, and the pressurizing comprising pressurizing the clad layer with pressurized fluid having a pressure exceeding 1000 kgf/cm$^2$ and being sufficient to collapse the void within the embedded optical waveguide device.

2. A manufacturing method according to claim 1, wherein said clad forming process includes introducing phosphorus, titanium, germanium, aluminum, boron, and/or fluorine, as a doping agent for refractive index adjustment, into the clad layer.

3. A manufacturing method according to claim 1, further comprising a process for forming a gas barrier protective film of a metal or ceramics on the surface of the clad layer before carrying out the heating/pressurizing process after the clad forming process, for inhibiting permeation of the pressurized fluid.

4. A manufacturing method according to claim 1, wherein said low-temperature film-forming method is a CVD (chemical vapor deposition) method and/or PVD (physical vapor deposition) method carried out at a temperature of 1,200° C. or below.

5. A manufacturing method according to claim 1, wherein said heating/pressurizing process is an HIP (hot isostatic pressing) method.

6. A manufacturing method for making a planar optical waveguide device having a plurality of cores formed on a substrate having a flat surface; and a clad layer covering the cores, comprising:

a core forming process comprising forming a core layer on the substrate by a low-temperature film-forming method;

a patterning process comprising etching said core layer to form a plurality of cores adjacent to each other with a clearance interposed therebetween on said substrate;

a clad forming process comprising forming the clad layer covering each core by the low temperature film-forming method;

a protective film forming process comprising forming a gas barrier protective film of a metal or ceramics on the surface of the clad layer; and a heating/pressurizing process comprising heating and pressurizing the clad layer to collapse a void within the optical waveguide device wherein the heating is at a temperature exceeding 800° C., and which is higher than in the low temperature film-forming method, and the pressurizing comprises pressurizing the clad layer with fluid having a pressure exceeding 1000 kgf/cm$^2$ and being sufficient to collapse the void within the embedded optical waveguide device from outside the gas barrier protective film.

7. A manufacturing method for making a planar optical waveguide device having a plurality of cores formed on a substrate having a flat surface; and a clad layer covering the cores, comprising:

a core forming process comprising forming a core layer on the substrate by a CVD method and/or PVD method;

a patterning process comprising etching said core layer to form a plurality of cores adjacent to each other with a clearance interposed therebetween on said substrate;

a clad forming process comprising forming the clad layer in a manner to cover each core by a CVD method and/or PVD method in a manner such that phosphorus, titanium, germanium, aluminum, boron, and/or fluorine is introduced, as a doping agent for refractive index adjustment, into the clad layer;

a protective film forming process comprising forming a gas barrier protective film of a metal or ceramics on the surface of the clad layer; and a heating/pressurizing process for heating and pressurizing the clad layer to collapse a void within the optical waveguide device wherein the heating is at a temperature exceeding 800° C., and which is higher than a process temperature of said CVD method and PVD method, and the pressurizing comprises pressurizing the clad layer with pressure exceeding 1000 kgf/cm$^2$ and being sufficient to collapse the void within the embedded optical waveguide device in the presence of an inert gas from outside the gas barrier protective film.

8. A manufacturing method according to claim 7, wherein said heating/pressurizing process is an HIP (hot isostatic pressing) method.

9. A manufacturing method according to claim 7, wherein said CVD method and/or PVD method is carried out at a temperature lower than 1,200° C.

* * * * *